(12) United States Patent
Luick (10) Patent No.: US 6,912,649 B2
(45) Date of Patent: Jun. 28, 2005

(54) SCHEME TO ENCODE PREDICTED VALUES INTO AN INSTRUCTION STREAM/CACHE WITHOUT ADDITIONAL BITS/AREA

(75) Inventor: David Arnold Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 470 days.

(21) Appl. No.: 10/097,199

(22) Filed: Mar. 13, 2002

(65) Prior Publication Data

US 2003/0177338 A1 Sep. 18, 2003

(51) Int. Cl.$^7$ .................................................. G06F 9/38
(52) U.S. Cl. ........................................ 712/220; 712/226
(58) Field of Search .............................. 712/220, 226, 712/227, 209

(56) References Cited

U.S. PATENT DOCUMENTS

| | | | | |
|---|---|---|---|---|
| 5,867,501 A | * | 2/1999 | Horst et al. ............... | 370/474 |
| 6,016,544 A | * | 1/2000 | Henry et al. .............. | 712/234 |
| 2001/0013093 A1 | * | 8/2001 | Banno et al. .............. | 712/210 |
| 2002/0152368 A1 | * | 10/2002 | Nakamura ................. | 712/226 |

* cited by examiner

Primary Examiner—Henry W. H. Tsai
(74) Attorney, Agent, or Firm—Moser Patterson & Sheridan, LLP (57) ABSTRACT

Methods, articles of manufacture and systems for encoding an instruction are provided, whereby available bits within the instruction can be indicated for use. The available bits may include zero bits and constant bits. In one embodiment available bits include any bits within an expanded word that are not necessary for the execution of an instruction contained in the word. In another embodiment, bits are made available by reformatting/re-encoding a word, whereby the number of bits of some fields is abbreviated to a lesser number of bits.

23 Claims, 6 Drawing Sheets

SCHEME TO ENCODE PREDICTED VALUES INTO AN INSTRUCTION STREAM/CACHE WITHOUT ADDITIONAL BITS/AREA

BACKGROUND OF THE INVENTION

1. Field of the Invention

The present invention generally relates to data processing systems and communication systems. More particularly, the invention relates to methods and apparatus for encoding predicted values into an instruction stream without the need for additional bits or areas of a device such a cache.

2. Description of the Related Art

Users of data processing systems continue to demand greater performance for handling increasingly complex and difficult tasks. Greater performance from the processors that operate such systems may be obtained through faster clock speeds so the individual instructions are processed more quickly. However, processing speed has increased much more quickly than the speed of main memory. Despite the speed of a processor, a bottleneck on computer performance is that of transferring information between the processor and memory. Therefore, cache memories, or caches, are often used in many data processing systems to increase performance in a relatively cost-effective manner.

A cache is typically a relatively faster memory that is intermediately coupled between one or more processors and a bank of slower main memory. Cache speeds processing by maintaining a copy of repetitively used information in its faster memory. Whenever an access request is received for information not stored in cache, the cache typically retrieves the information from main memory and forwards the information to the processor. If the cache is full, typically the least recently used information is discarded or returned to main memory to make room for more recently accessed information.

The benefits of a cache are realized whenever the number of requests to address locations of cached information (known as "cache hits") are maximized relative to the number of requests to memory locations containing non-cached information (known as "cache misses"). Despite the added overhead that occurs as a result of a cache miss, as long as the percentage of cache hits is high (known as the "hit rate"), the overall processing speed of the system is increased.

Illustratively, one method of increasing the hit rate for a cache is to increase the size of the cache. However, cache memory is relatively expensive and is limited by design constraints, particularly if the cache is integrated with a processor on the same physical integrated circuit. This is especially true if a method or scheme require extra area or space of a cache memory such as an instruction cache RAM of an instruction cache subsystem.

As an illustration, one cost-effective alternative is to chain together multiple caches of varying speeds. A smaller but faster primary cache is chained to a relatively larger but slower secondary cache. Furthermore, instructions and data may be separated into separate data and instruction caches. Illustratively, some processors implement a small internal level one (L1) instruction cache with an additional external level two (L2) cache, and so on.

Furthermore, it is known to have two separate caches within a computer system, i.e., an instruction cache, also know as an I-cache; and a data cache, also known as D-cache. The I-cache is used for storing instructions.

One application of the I-cache is the use of value prediction based on re-usage of a previous code execution result derived from a stable history value. This application requires stable history values for executions through dependencies and the dependency that limits performance for integer code, netting a substantial performance gain. However, most modern computer architectures are 64-bit architectures. For a cache to retain enough 64-bit values to maintain an acceptable hit rate requires quite a large storage area within the cache. Furthermore, in addition to taking significant chip area or storage area, an additional array of the same size (64-bit) will slow down operational speed, which necessarily limits performance gain.

Therefore, there is need for a method and apparatus for storing additional information (such as predicted values) in an instruction stream without requiring additional space.

SUMMARY OF THE INVENTION

The present invention generally provides methods, articles of manufacture and systems for encoding values (such as predicted values) into an instruction stream without additional bits.

One embodiment provides for a method for data processing, comprising: receiving from an input source a word comprising an instruction; and appending an indicator to the word, wherein the indicator indicates at least one available bit within the word.

Yet another embodiment provides a data processing system comprising a memory having designated instructions stored therein; a bus coupled to the memory; a cache subsystem, having a cache memory, coupled to the bus; and a pre-decoder/re-encoder having a first end coupled to the bus, and a second end coupled to the cache subsystem, the pre-decoder/re-encoder appends an indicator to an instruction coming from the bus, whereby at least one available bit within the instruction are indicated as available for use.

In one embodiment, the aforementioned available bit is at least one of: (a) not necessary for the execution of the instruction; and (b) part of N bits capable of being reformatted so that a meaning of the N bits is preserved using some number of bits less than N. In one embodiment, the available bit may be used to store a value, such as a predicted value, thereby avoiding the need for additional space in a cache to hold the predicted value.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides embodiments for methods, articles of manufacture and apparatus for encoding values (such as predicted values) into an instruction stream, such as in a cache, without the need for additional bits or area therein. The embodiments require no additional array space for a great majority of cases that use value prediction applied to a microprocessor core. Embodiments of the present invention are premised on the inventor's observation that, in many cases, an I-cache is not fully utilized in that instructions occupy less than the whole length of a word. In other words, an instruction usually does not take every bit of data within a word. For example, if an I-cache has a 32 bit instruction or word length, an instruction may only take 27 bits. As a result, 5 bits are available for some other user. In addition, the word may be expanded to include more than 32 bits and a portion of the expanded word may be used to store useful information. Accordingly, the unused, or inefficiently used, space or area of individual instruction words may be identified and used.

In some embodiments of the invention, an instruction may be re-encoded with, for example, a one bit flag. The flag bit may indicate a certain bit(s) in the original instruction which may be used to store a value(s) in. In general, the flag may identify bits not necessary for the execution of the instruction and/or part of N bits capable of being reformatted so that a meaning of the N bits is preserved using some number of bits less than N. In one embodiment, the bit(s) may be used to store a value, such as a predicted value, thereby avoiding the need for additional space in a cache to hold the predicted value. In one embodiment, the flag may be appended by a coder device such as a pre-decoder/encoder.

Figure 1A:
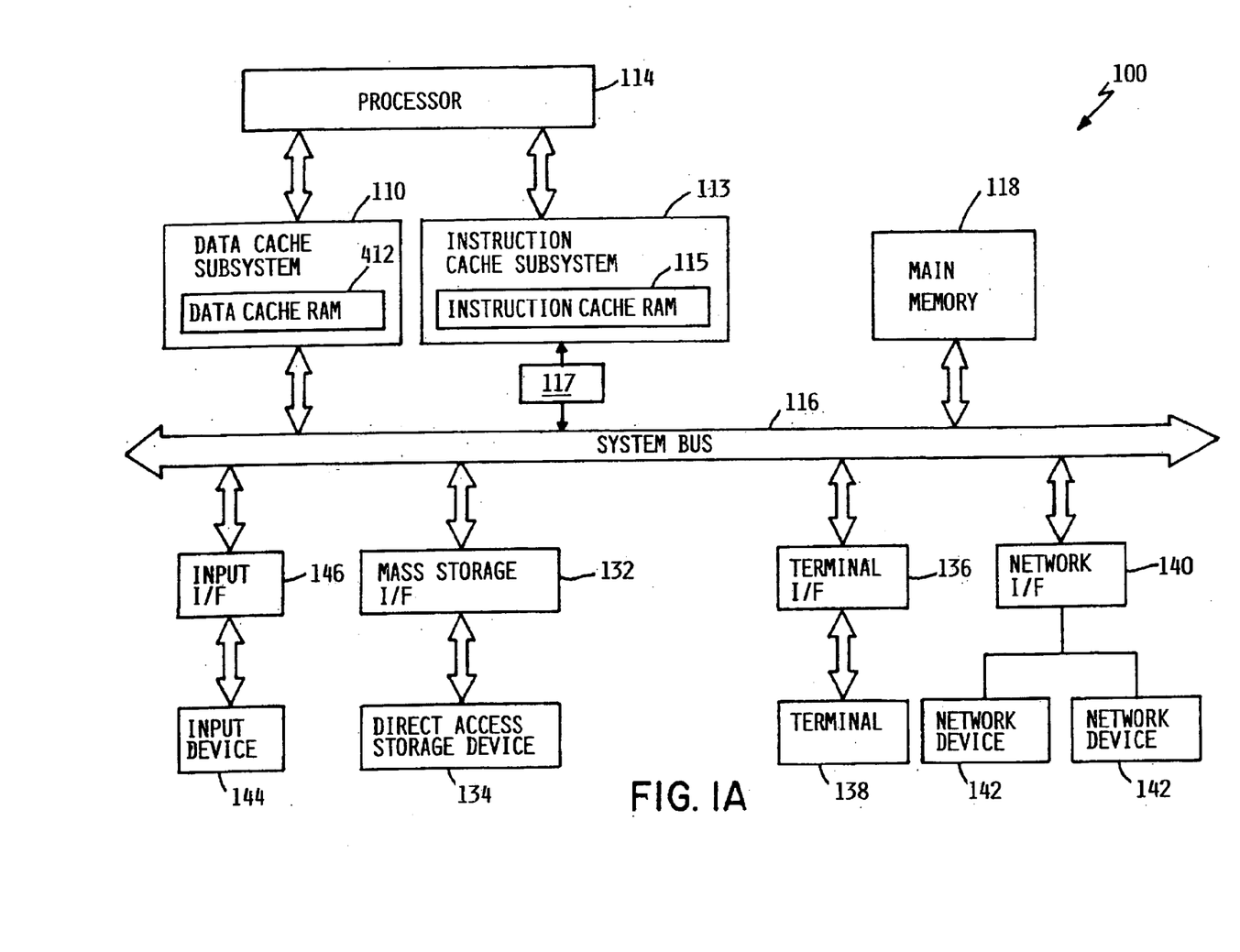
FIG. 1A is a computer system according to an embodiment of the present invention.

FIG. 1A shows a computer system 100 according to an embodiment. Illustratively, the computer system 100 includes a system bus 116, at least one processor 114 coupled to the system bus 116 via a data cache subsystem 110 and an instruction cache subsystem 113. The instruction cache subsystem 113 includes an instruction cache RAM 115. The data cache subsystem 110 is coupled to a pre-decoder/re-encoder 117, which is also coupled to system bus 116. Pre-decoder/re-encoder receives information from system bus 116. The information may be instruction words from various sources such as a memory. The computer system 100 also includes an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 are desktop or PC-based computers, workstations, network terminals, or other networked computer systems. Input device 144 can be any device to give input to the computer system 100. For example, a keyboard, keypad, light pen, touch screen, button, mouse, track ball, biometric devices, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed registers and caches to lower speed but larger DRAM chips.

Figure 1B:
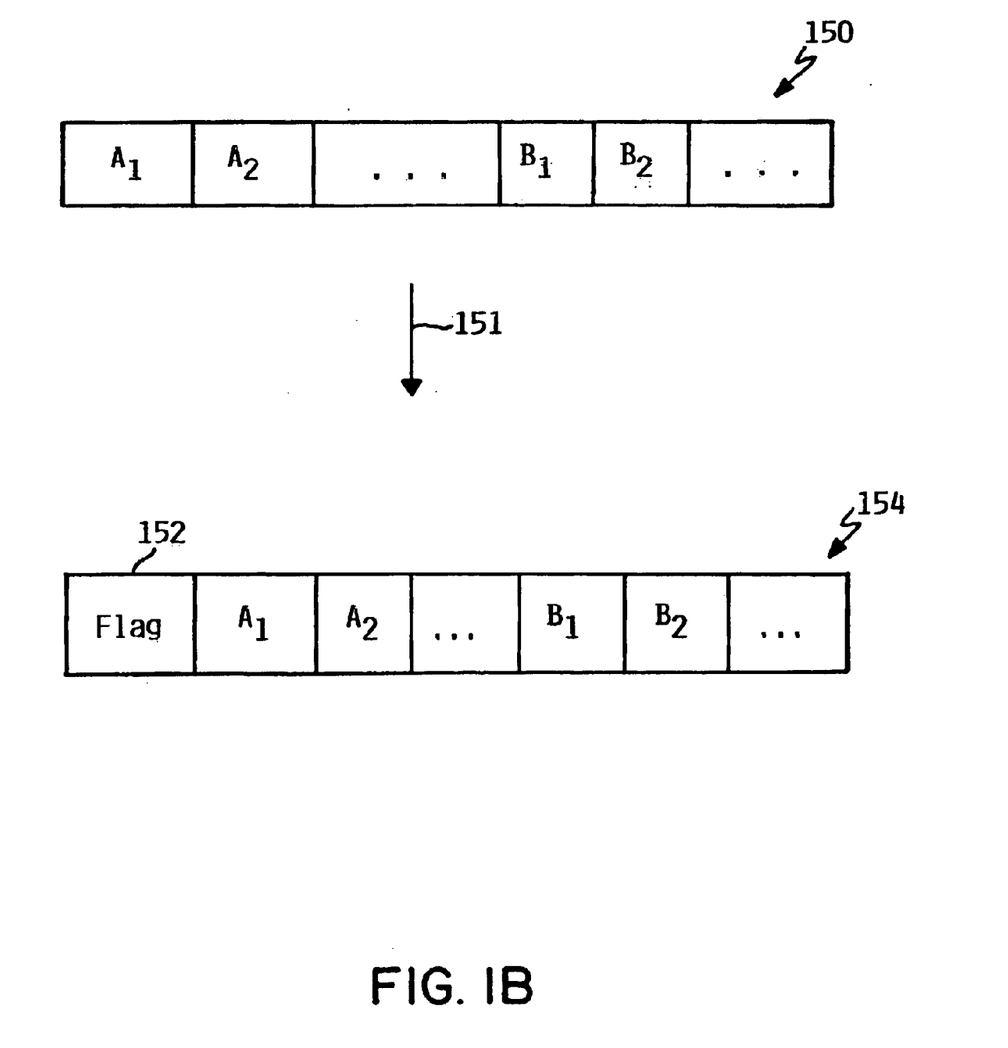
FIG. 1B is an instruction word before and after it goes through an encoder of the computer system of FIG. 1A.

FIG. 1B shows one embodiment of a process performed by the combined pre-decoder/re-encoder 117. Initially, an input of instruction 150 coming from an input source such as main memory 118 via system bus 116 is input into the combined pre-decoder/re-encoder 117. Illustratively, the inputted instruction is 32 bits wide and comprises a plurality of fields (only four shown). The four fields shown are A1, A2, B1, and B2. A field is a congregate of one or more bits, which forms part of the word. For example, the instruction 150 may have 32 bits and A1 may be a 10 bit field within the instruction. The input instruction 150 is then pre-decoded and re-encoded 151 to produce an encoded instruction 154 which may include fields that have been reformatted from the original fields of the primitive instruction and fields in addition to the original fields, such as execution flags, power tokens, counters, etc.

In one embodiment, Re-encoding 151 includes appending a flag 152 to the encoded instruction 154. The flag 52 is an indication that part of encoded instruction 154 is available for storage of useful information. For example, the flag 152 may be inserted into encoded instruction 154 to indicate that the bits in fields A1 and B1 are available for use as storage space. The availability of the bits is based upon a determination that the bits are not necessary for normal operation intended for pre-decoded instruction 150. For example, if A1 is known to have 9 bits whose value is known to have no effect (e.g., based upon prior statistics) upon the normal operation of pre-decoded instruction 150, the flag 152 may indicate that A1 is available for some usage.

As will be appreciated, the addition of the flag 152 necessarily takes some space. In general, the length or size of flag 152 may be one bit or several bits. Of course, the length of the flag 152 should be less than the bits made available from an instruction. In a particular embodiment, the length of the flag 152 may generally be 1–2 bit wide.

The bits identified for use in the foregoing manner (as identified by the flag 152) are referred to herein as "available bits". In general, the available bits may be either made available by stealing bits or reformatting bits. Stealing bits refers to earmarking some portion of the original bits of a word, e.g., word 154. For example, in any given word there may exist some zeros and constants with no information content or no known information content. Accordingly, these bits are available for stealing. Reformatting bits refers to reformatting some number of bits into a lesser number of bits, thereby freeing a portion of bits (the available bits) for use. For example, a field of six bits with all 1's may be re-encoded by appending a flag of one bit which preserves the original meaning of the field. Thus, five bits are made available for something else. Therefore, by stealing or with a proper redefinition of some bits or fields, it is almost always possible to free up 16–32 bits per individual instructions and up to 64 bits in an instruction pair which can be redefined to be individual values for that instruction. It should be noted that the invention is not limited to the manner in which stolen/reformatted bits are used in any application.

In one embodiment, the information stored in the available bits is a prediction value. In one aspect, a predicted value is the value an instruction produced in a previous execution. In a value prediction context, the combined pre-decoder/re-encoder 117 may perform a re-encoding 151 before instruction 150 is stacked up in the instruction cache ram 115 of the instruction cache 113. In the value prediction context, the flag 152 is referred to herein as a load value immediate (LVI) flag. In one embodiment, prior to appending the LVI flag, the pre-decoder/re-encoder 117 determines the presence of at least one available bit by determining that a previous instruction of a same type as the current instruction contains the at least one available bit.

In one embodiment, a value prediction flag is not incorporated into the encoded instruction 154. Instead, a value prediction flag may exist independent of the encoded instruction 154. For example, a separate register may be provided for value prediction. The presence, or value, of the value prediction flag may then be used to indicate that bits are available for usage in some particular instruction. It should be noted that even with modern 64 bit effective addressing architecture, most addresses have fewer than 64 significant bits. Typically, most addresses have less than 32 significant bits. As for actual data (operands), 32-bit words may still be the dominant size. Given that addresses are around 80% of the total and 32–36 significant bits may occur in over 95% of the cases, and that ⅔ of data cases may be 32 bits or less, 32–36 bits of prediction history immediate covers approximately 90% of the opportunity for history value prediction.

It is noted that the decoding process of FIGS. 1A and 1B may be similarly performed on a L2 cache. Because the space or area in L2 cache is valuable, the extra fields may not be kept there. However, at least the LVI flag 152 is needed in the L2 cache if the functions of combined pre-decoder/re-encoder 117 are to be maintained.

Figure 2A:
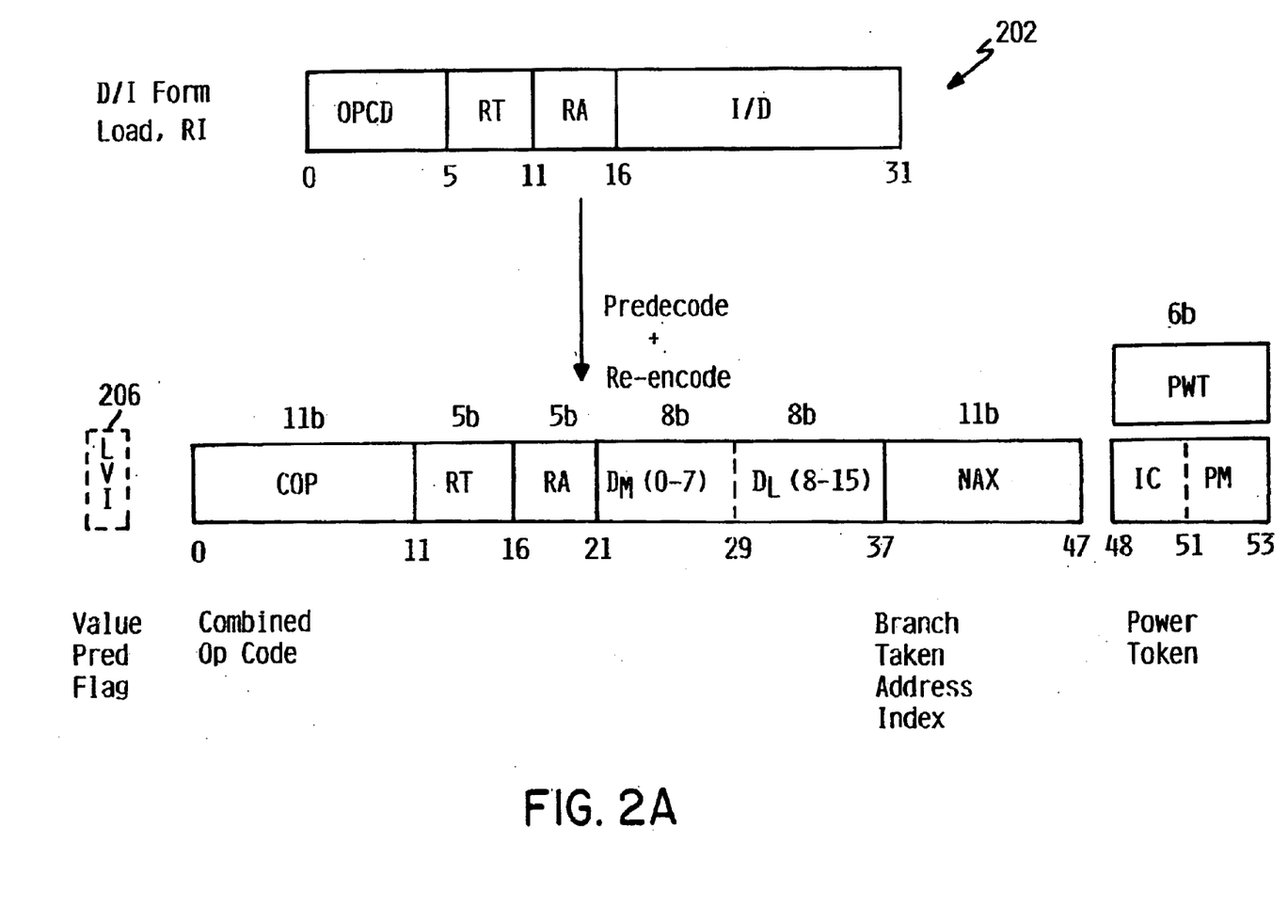
FIG. 2 is a pre-decoded RISC instruction in both I/D and X form formats.
Figure 2B:
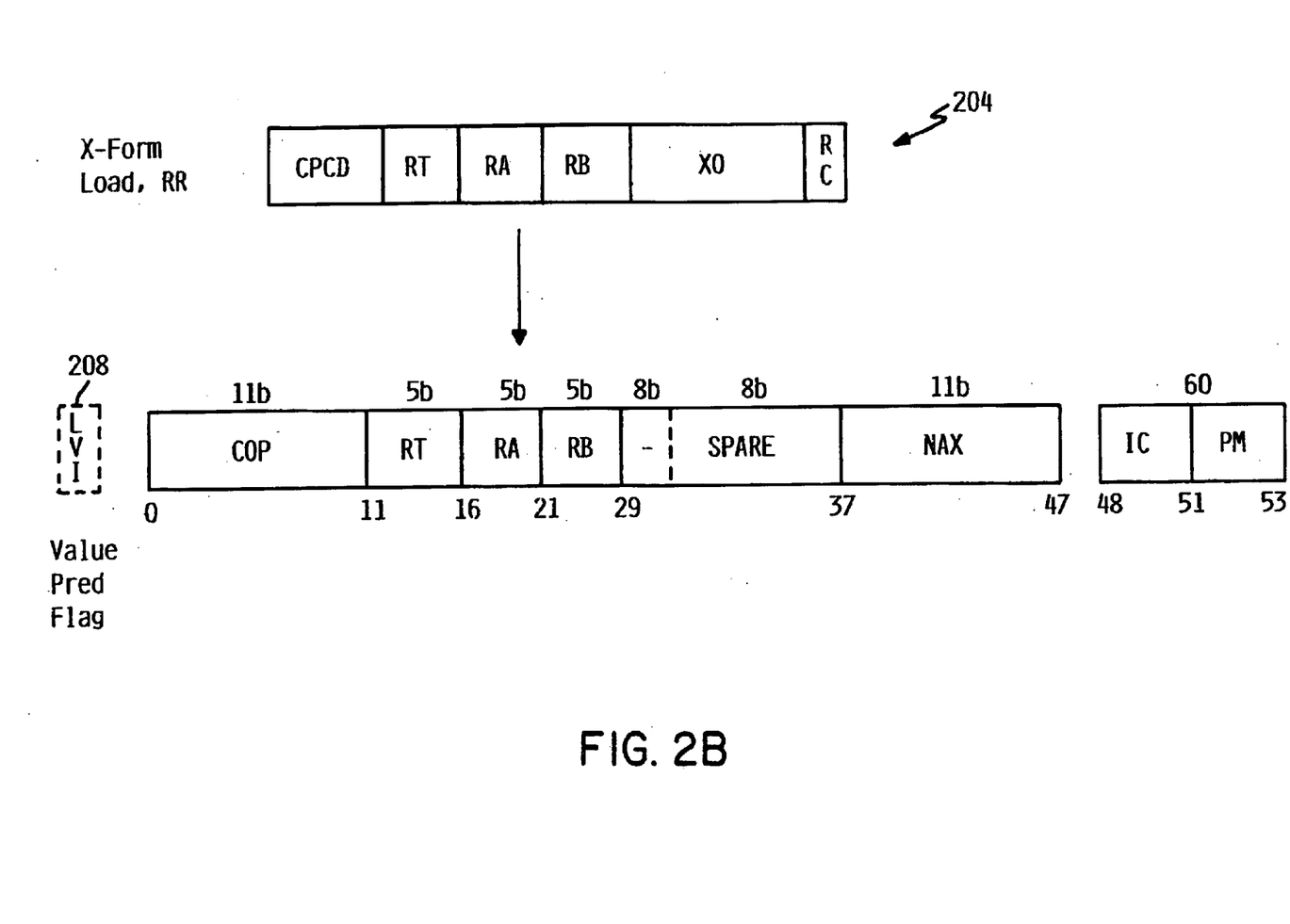

The following figures illustrate some aspects of the present invention. Referring to FIG. 2, a pair of pre-decoded RISC instructions in both D/I and X form formats is shown. Specifically, the D/I form Load RI 202 and the X-Form load RR 204 are shown. Here, the basic 32-bit RISC primitives of the D-form and the X-form load are expanded (via pre-decoding and re-encoding) to include three additional flag fields appended to it to speed execution and minimize execution power. Illustratively, the three additional flag fields are COP NAX, and power token fields. First, the primary op code (6 bits) and the extended op code (10 bits) are combined into a single 11 bit combined op code or COP field. Second, a 3 bit Instruction Class (IC) field ts generated indicating eight instruction types: X-form load install (XLD/ST), D-form load install (DLD/ST), register to register (RR₁), register immediate (RI), branch (BR), condition register select (CR/SEL), COMPLEX, and no OP (NOOP). These eight instruction types are encoded into a three bit field such as the IC filed. A second 3 bit Power Management (PM) field is added to indicate that functional subunits for each instruction class are to be activated for that instruction. The 3 bit IC field plus the 3 bit PM field form the 6 bit power token (PT). Finally, for this example, each instruction has a resolved branch target address index field appended (or a next address field NAX), which is simply the real next address Index for addressing the L1 cache such as instruction cache subsystem 113 for any branch taken (i.e., predicted taken via a prediction bit) that would have been executed in parallel with the other instructions in an execution group. For example, for a 4K page there are 12 real blts with word alignment, so the real address Index (NA) is 10 bits. An $11^{th}$ bit is added to indicate a branch to link register case. The expanded pre-decoded/pre-recolved form of the instruction becomes 32+5 (COP code) [+11(PWT)+11 (NAX)=54 bits, plus a 1 bit LVI flag indicating a load verity immediate is encoded.

Furthermore, recognizing the previously mentioned fact that some fields are either unused, inefficiently used or contain mostly zeroes in some instruction types using history value prediction, it is possible to imbed up to a 34 bit history immediate value. As a result, the expanded instructions are formatted with an LVI flag 206, 208 indicating that bits have been stolen and/or reformatted to make bits available for other uses (such as storing predicted values).

Figure 3:
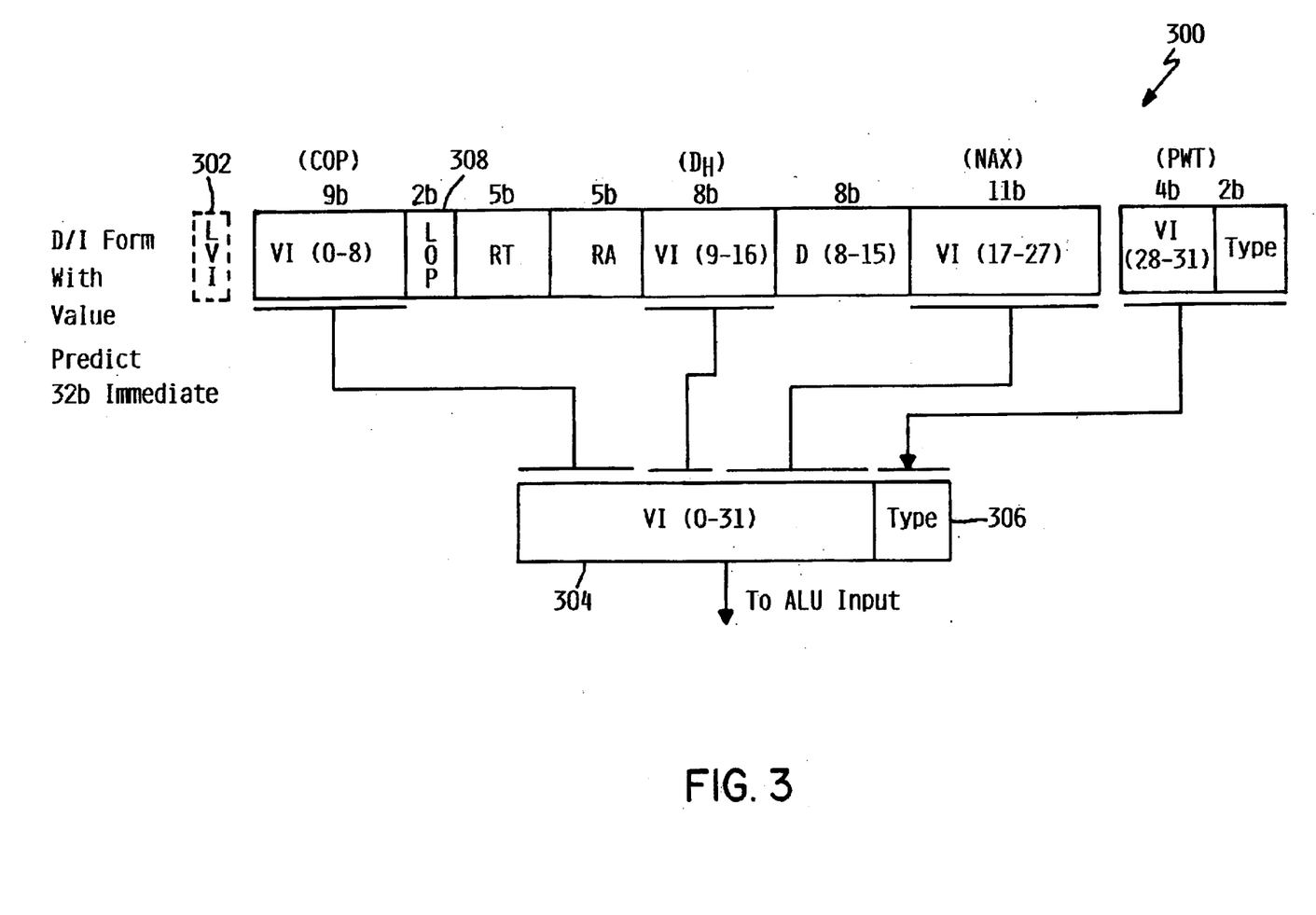
FIG. 3 is a re-encoding of a word using predicted value.

FIG. 3 shows a re-encoding of a word 300 to make bits available, such as for storing a predicted value. Illustratively, word 300 is in D/I form with a value predict of 32 bit immediate. An LVI flag 302 indicates that the word has been redefined by stealing/reformatting some bits from various fields (shown by underlining). For example, the underlined fields are predetermined by the pre-decode process to be zero, constants or otherwise not necessary for the execution of the instruction contained in the word 300, and therefore are available for another use (in this case, predicted value storage). Illustratively, there are four such fields shown: a COP field (which is a value immediate having nine bits), a high byte of displacement, $D_H$, (which is a value immediate having eight bits), NAX (which is a value immediate having 11 bits), and a PWT field (which comprises a value immediate having 4 bits and a counter having 2 bits). The four fields are combined into a 32 bit value predict immediate field 304 and a 2 bit type field 306 indicating how large the target operand is. The 32 bit value predict immediate field 304 and the 2 bit type field 306 form an input to an arithmetic logic unit (not shown) of a processor such as processor 114 of FIG. 1A.

Table 1 shows a set of values for the two bit LOP (load operation) 308.

TABLE 1

| LOP (0, 1) | Load Type |
| --- | --- |
| 0 | LBZ |
| 1 | LHZ |
| 2 | LWZ |
| 3 | LD |

LBZ, LHZ, LWZ and LD, respectively stand for load byte, load half, load word, and load double word.

With reference to the D-form load examples above (FIGS. 2 and 3), it is observed the usual case for these loads does not require the instruction bits in the four underlined fields (FIG. 3) for execution. This is because a single additional op code flag bit, the LVI flag bit, may be added to indicate the LVI (load value immediate) load function. Thus, the general combined op code field of 11 bit, i.e., the 9 bits of COP, plus the 2 bits of LOP, is not required. Only the 2 bit LOP subfield indicating which of the four possible data widths are being value predicted for the load may be required.

Loads typically have a 16 bit displacement value field. However, it is noted that about 90% of loads have a displacement value of less than or equal to 8 significant bits. Further, the most common loads of addresses have bits 13–15 of the displacement equal to all zeros at least 99% of the time. Thus, ninety five percent of D-form loads can be encoded with only an 8-bit displacement field, freeing up an additional 8 bits. For X-Form loads, a hundred percent of extended opcode (XO) fields maybe freed, thus the additional 8 bits may be stolen.

Lastly, in FIG. 3, the Power Token (PWT) field may also be re-encoded for value predicted loads since the single LVI flag can generate a default power value of, for example, "000111", for use in power control. This way, 6 more bits are freed for other use.

Thus, re-encoding four fields of a partially re-encoded instruction has freed up the requisite 34-bit immediate field necessary to specify a 32-bit word immediate predicted value and a 2 bit confirmation count field (CNT).

Figure 4:
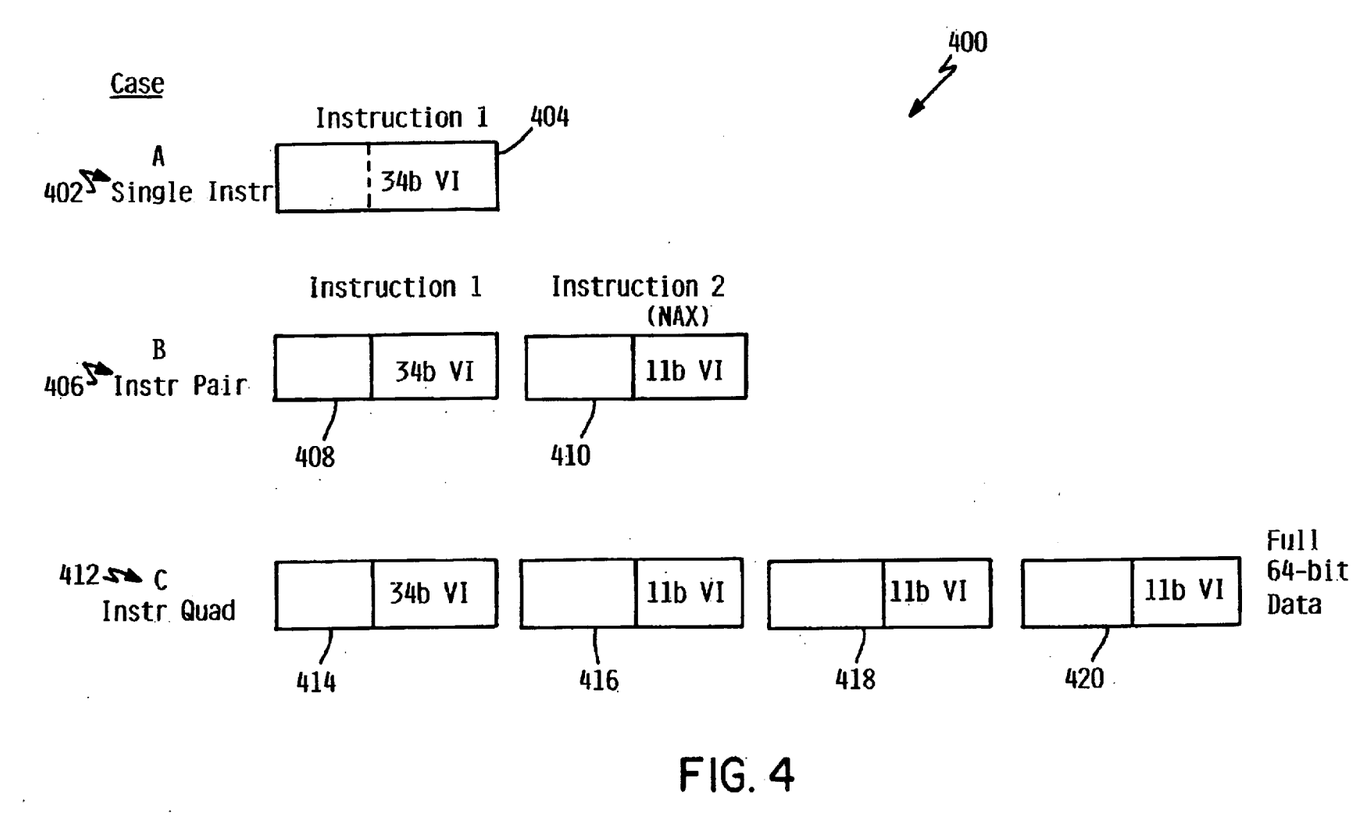
FIG. 4 is a scheme where instructions can be paired or quaded to achieve larger immediate sizes.

FIG. 4 shows a scheme 400 where instructions can be individually determined, paired or quaded to achieve larger immediate sizes, such as half word, or full word. Some immediate size can be as large as a 64-bit full value by way of employing unused branch NAX fields in the absence of a token branch in that group. It should be noted that a single 32-bit immediate will suffice for 95–99% of address values and word data values, which wholly dominate the load frequency for integer codes. Case A 402 depicts a single instruction 404 wherein no branch exists. The 32 bits of typical address or word data assumes bits (0–31) of DW, double word which are zeros.

Case B 406 depicts an instruction pair comprising first instruction 408 and second instruction 410. First instruction 408 comprises a 34 bit value immediate. Second instruction 410 comprises an 11 bit value immediate derived from NAX. Assuming bits 0–21 of DW are zeros, 43 bits of large address.

Case C 412 depicts an instruction quad comprising a first instruction 414, a second instruction 416, a third instruction 418, and a fourth instruction 420. First instruction 414 comprises 34 bits of value intermediate. Second instruction 416, third instruction 418, and fourth instruction 420 each comprise an 11 bit value intermediate.

It is noted that in cases B and C no branch predict can be a taken in each execution group.

While the foregoing is directed to embodiments of the present invention, other and further embodiments of the invention may be devised without departing from the basic scope thereof, and the scope thereof is determined by the claims that follow.

What is claimed is:

1. A method for data processing, comprising:
   receiving from an input source a word comprising an instruction; and
   appending an indicator to the word, wherein the indicator indicates at least one available bit within the word and wherein the at least one available bit is one of:
   not necessary for the execution of the instruction; and
   part of N bits capable of being reformatted so that a meaning of the N bits is preserved using some number of bits less than N, wherein N is an integer greater than 1.

2. The method of claim 1, further comprising moving the instruction into a cache subsystem.

3. The method of claim 1, further comprising expanding the word into an expanded format and wherein the at least one available bit is located in the expanded format.

4. The method of claim 1, wherein the at least one available bit comprises the part of the N bits and further comprising reformatting the N bits while preserving the meaning of the N bits.

5. The method of claim 1, wherein the appending is performed by a decoding/encoding device.

6. The method of claim 1, further comprising storing a value in the at least one available bit indicated by the indicator.

7. The method of claim 1, further comprising storing a predicted value in the at least one available bit indicated by the indicator.

8. The method of claim 1, further comprising storing a value in the at least one available bit indicated by the indicator.

9. The method of claim 1, further comprising, prior to appending, determining the presence of the at least one available bit by determining that a previous instruction of a same type as the instruction contains the at least one available bit.

10. The method of claim 1, wherein the at least one available bit is located in a field of the instruction.

11. The method of claim 10, wherein the field comprises at least one of a combined opcode (COP) field, a high displacement ($D_H$) field, a next address (NAX) field, and a power token (PWT) field.

12. The method of claim 1, wherein the at least one available bit comprises at least one of zero value bits and constant value bits.

13. The method of claim 1, wherein the indicator comprises an load valve immediate (LVI) flag.

14. The method of claim 1, wherein the cache subsystem comprises an instruction cache subsystem.

15. A data processing system, comprising:
   a memory having designated instructions stored therein;
   a bus coupled to the memory;
   a cache subsystem, having a cache memory, coupled to the bus; and
   a coder device having an input coupled to the bus, and an output coupled to the cache subsystem, wherein the coder device is configured to append an indicator to a word containing an instruction coming from the bus, wherein the indicator indicates available bits within the word not necessary for the execution of the instruction.

16. The data processing system of claim 15, wherein the available bits indicated by the indicator are used for storing predicted values.

17. The data processing system of claim 16, wherein the available bits comprise fields selected from at least one of a combined opcode (COP) field, a high displacement (DH) field, a next address (NAX) field, and a power token (PWT) field.

18. The data processing system of claim 15, wherein the cache subsystem comprises an instruction cache subsystem.

19. The data processing system of claim 15, wherein the cache subsystem comprises Level one (L1) cache.

20. The data processing system of claim 15, wherein the cache subsystem comprises Level 2 (L2) cache.

21. The data processing system of claim 15, wherein the word contains a field containing N bits representing an identity and wherein the coder device is configured to reformat N bits of the word to N−X bits, wherein X bits are the available bits and the identity of the N bits is preserved, wherein N is an integer greater than 1 and X is an integer less than N.

22. The data processing system of claim 15, wherein the coder device is configured to identify the available bits.

23. The data processing system of claim 19, wherein the available bits identified by the coder device are selected from at least one of:
  constant bits; and
  zero bits.

* * * * *